Feb. 20, 1968  E. A. MEEDER, JR  3,369,521

MECHANICAL DAMAGE INDICATOR

Filed Feb. 2, 1966

INVENTOR.
EDWARD A. MEEDER
BY
Constantine A. Michalos
ATTORNEY

United States Patent Office 3,369,521
Patented Feb. 20, 1968

1

3,369,521
MECHANICAL DAMAGE INDICATOR
Edward A. Meeder, Jr., Wayne, N.J., assignor to The
Bendix Corporation, a corporation of Delaware
Filed Feb. 2, 1966, Ser. No. 524,411
8 Claims. (Cl. 116—114)

ABSTRACT OF THE DISCLOSURE

An impact mechanical damage indicator to establish the dynamic loading experienced by equipment packaged for transportation. A frangible sphere having a dye therein is supported and centered within a transparent plastic sphere by a plurality of caged balls engaging the inner surface of the transparent plastic sphere and outer surface of the frangible sphere. Weights are attached to portions of the ball cage so that upon impact, one of the caged balls tends to contact the frangible sphere along the axis of maximum impact so as to break the frangible sphere and thereby splash the dye upon the inner surface of the transparent plastic sphere. The transparent plastic sphere is replaceable and suitably mounted within a frame attachable to the package.

This invention relates to impact indicators and more particularly to a mechanical damage indicator device utilized to establish the dynamic loading shock experienced by equipment packaged and transported in a shipping container.

Heretofore it has been the practice to use shock indicators designated to record or indicate maximum acceleration magnitude or overload occurrence experienced by a package in transportation. Some of these devices trip at a predetermined acceleration or record the acceleration magnitude that occurs within predetermined acceleration ranges. Other devices only indicate the maximum acceleration experience.

Where these devices are used in conjunction with actual equipment shipped, the purpose is to establish whether or not damaging accelerations were experienced during shipment. In most cases the triggering of a trip device or the recording of accelerations in excess to an established maximum rejects the shipment.

The systems hereinbefore had limited frequency response and were also limited to directional acceleration sensitivity such as uniaxial, uniplane or hemispherical accelerations. In addition they had fixed relationship between their directional sensitivity and geometry of package. They were relatively large and expensive if it necessitated the use of acceleration time history or acceleration occurrence history.

In the present invention the mechanical damage indicator utilizes a mechanical fuse concept which responds to excessive external accelerations due to transportation handling. The present invention utilizes the concept of a spherical frangible material such as glass used as a fuse which would break due to excessive or cummulative external acceleration. As a result of breakage, a visual indication of excessive dynamic loading would be evident.

In order to develop this device, brittle or frangible spheres must be available with various predictable uniform breaking strength characteristics. The latter would be custom developed to fit various applications.

Considerable failure testing will be required to establish the above characteristics for mechanical fuse designs statistically. Presently there is available in mass production small outside diameter, thin walled, glass spheres that have very goo duniformity. Surface conditioning methods can be employed to achieve uniform strength characteristics.

Therefore, it is an object of this invention to provide a mechanical damage indicator which has more comprehensive damage determination by including a breakage characteristic fused or frangible material to be used as a criteria to determine excess acceleration.

Another object of this invention is to provide a mechanical damage indicator having a frangible spherical directional acceleration sensitivity for determining excess acceleration.

Another object of this invention is to provide a mechanical damage indicator which has a memory system or provides cumulative effects and overloading.

A further object of this invention is to prvoide a mechanical damage indicator having a wide frequency response spherical sensitivity and with a positive means of alignment of th sensitive axis with normal gravitational acceleration.

An additional object of this invention is to provide a mechanical damage indicator that is economical to build in quantities and is relatively small thereby having a high packing density.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

Figure 1:
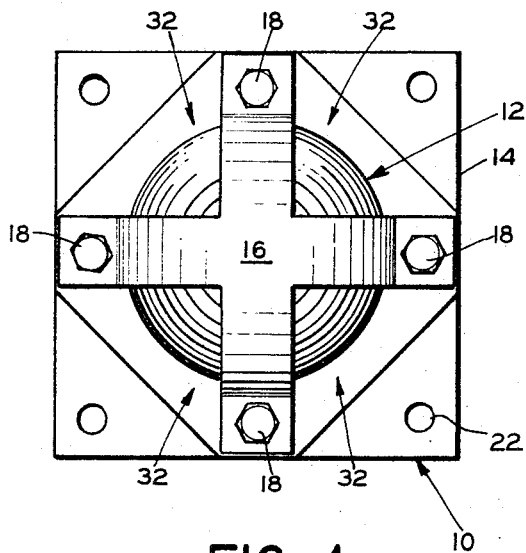
FIGURE 1 shows a plan view of the mechanical damage indicator in accordance with the preferred embodiment of this invention.

Referring now to the drawing, it is illustrated that a mechanical damage indicator comprises a two-piece holding frame 10 supporting an expendable assembly 12. The frame 10 includes a base portion 14 and a crisscross strap portion or straps 16 which is fastened together by means of bolts 18.

More specifically the base portion 14 includes a flange 20 provided with mounting holes 22 to enable the indicator to be fixed on the item within the shipping package, which indicator is utilized to establish the dynamic loading shock experience by the packaged item in transportation. In addition, the base 14 includes a body portion 24 having a centrally located hemispherical recess 26 and four threaded holes 28 for receiving therein the bolts 18.

Figure 2:
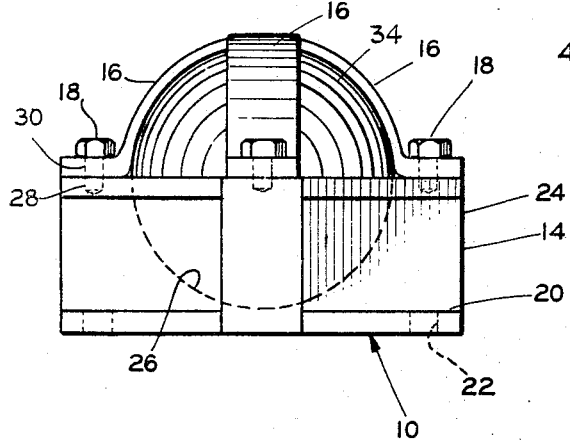
FIGURE 2 shows a side elevational view of the invention shown in FIGURE 1.

The crisscross strap portion 16 is also formed of a hemispherical configuration with four holes 30 through which the bolts 18 may be inserted for fastening the strap portion 16 onto the base portion 14. As shown in FIGURES 1 and 2, the strap portion 16 is so designed that visual access may be had of the expendable assembly 12 at four diagonally opposite apertures 32.

Figure 3:
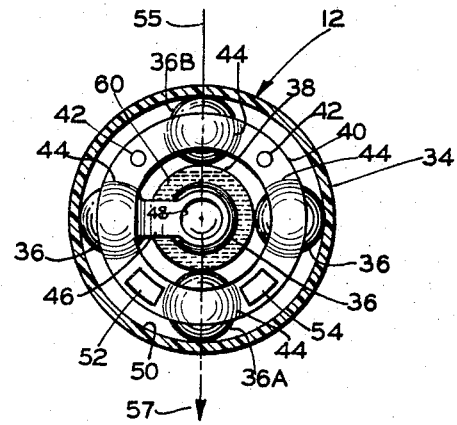
FIGURE 3 is a view of the expendable assembly of FIGURE 1 showing the transparent plastic sphere in section and a top plane view of the interior ball cage with the balls arranged within the plastic sphere and about a frangible sphere in one of the orientations which the interior elements may assume within the expendable assembly.
Figure 4:
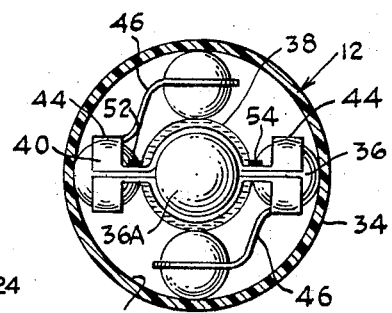
FIGURE 4 is an elevational view of the expendable assembly of FIGURE 3 showing the transparent plastic sphere in section and an edge view of the interior ball cage with the balls therein arranged within the plastic sphere and in an orientation about the frangible sphere displaced ninety degrees from that shown by FIGURE 3.

Referring to FIGURES 3 and 4, it is illustrated that the expendable assembly 12 comprises a transparent plastic case 34 used to envelop six metal balls 36 which in turn encircle a single brittle or frangible sphere 38 which may have a predetermined breaking value; that is, predetermined breaking strength characteristics. The balls 36 are held in position around the frangible sphere 38 by a bracket or ball bearing cage 40. The cage 40 is formed of a pair of opposed rings connected together by rivets 42, as shown in FIGURE 3. Each of the rings of the cage 40 have four indentations 44 therein and are so assembled as to form enveloping belts about each of four of the balls 36, thereby permitting each of the four balls 36 to rotate in spaced relationship to each other. In addition, each of the rings of the cage 40 include at one indentation thereof a protuberance or arm 46. Arms 46 thus extend perpendicular from the rings of the cage 40 and are positioned at opposite sides of the frangible sphere 38. Each of the arms 46 have provided therein an aperture 48 for supporting therein one of the other two balls 36. Through the apertures 48 these balls 36 may extend into contacting relation with an inner surface 50 of the transparent plastic case 34, as shown by FIGURES 3 and 4.

Furthermore, as shown in FIGURE 3, the cage 40 is provided with a pair of weights 52 and 54 which operate so as to always present a sensitive axis, such as axis 55, through the two balls 36A and 36B with the line of action during free fall impacts. That is, if the package, on which is attached the mechanical damage indicator, is dropped the ball 36A interposed between the weights 52 and 54 will be rotated downwardly by gravity acting on the weights 52 and 54 so that when the package contacts the floor, the ball 36B in line with the sensitive axis 55 will cause a maximum force to be applied on the frangible sphere 38. This direct contact of the ball 36B against the frangible sphere 38 will cause a maximum breaking force to be applied thereby on said sphere 38 acting in the direction indicated by the arrow 57 on axis 55.

Furthermore, if the package is accelerated in a forward direction, the dynamic acceleration force will cause the weights 52 and 54 to direct the ball 36A in a rearward direction during acceleration so that the ball 36B opposite to ball 36A in line with the sensitive axis 55 will apply maximum force against the frangible sphere 38 on impact.

As outlined before, the transparent plastic case 34 is supported between the straps 16 and base portions 14 by the four bolts 18. The straps 16 are so designed as to permit visual access of the expendable assembly 12 at apertures 32 to determine whether the frangible sphere 38 has been broken or not in transit.

It should be also understood that the frangible sphere 38 may contain a colored liquid dye 60 so that when the sphere 38 is broken, the liquid dye 60 will spill out within the transparent plastic case 34 and thereby give a visual indication that the package associated with the mechanical damage indicator has been subjected to excessive acceleration forces. The expendable assembly 12 may be readily replaced by unscrewing the four bolts 18 to separate the two portions 14 and 16 of the frame 10 for removing the broken expendable assembly 12 used in association with one package and for inserting a new expendable assembly within the frame 10 to be shipped with another package.

In use, a configuration would be selected which best fits the established or estimated acceleration tolerance characteristics of the item being shipped. The mechanical damage indicator would be securely attached to the item being shipped. At the items destination, the mechanical damage indicator would be visually checked for breakage. If it is intact, the item is accepted. If the frangible sphere 38 has broken, the item is rejected or recalibrated.

In the case where the frangible sphere 38 is intact upon delivery, it cannot be reused because of its damage memory. That is, the sphere 38 may have been subjected to several minor accelerations which might not have been large enough to break it but on the other hand might have introduced fatigue stresses within the sphere 38 that might cause its breakage upon an additional minor acceleration. However, where required, the relative amounts of damage between shipments may be determined by relatively simple failure testing. The intact sphere 38 could be subjected to either static or dynamic compressive loading, as assembled, to establish its final strength. The difference between this strength and its original strength is an indication of the shipment damage. In any event, the frangible sphere 38 would be expendable and designed as a throw away item.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. An impact indicator device utilized to establish the dynamic loading experienced by equipment packaged for transportation, said impact indicator device comprising a frangible means having a predetermined breaking value, means sensitive to accelerational forces associated with said frangible means for directing a load to said frangible means in excess of the breaking value of said frangible means when said indicator device senses excessive accelerational forces, said frangible means including a frangible sphere, said means sensitive to accelerational forces including a plurality of balls encircling said frangible sphere, and supporting means including ball bearing spacer means supporting said balls and permitting free rotation of said balls about said frangible sphere, weights supported by said bearing spacer means adjacent one of said balls for directing said one ball in a sensitive line with a maximum accelerational force to cause another of said balls in alignment with said one ball and in said sensitive line to apply a force to said frangible sphere to effect breakage of said frangible sphere when said indicator senses excessive accelerational conditions.

2. The combination defined by claim 1 including a transparent outer case enveloping and supporting said plurality of balls adjacent said frangible sphere, a colored liquid within said frangible sphere for spillage within said outer case upon breakage of said frangible sphere to indicate an excessive accelerational condition.

3. An impact indicator device utilized to establish the dynamic loading experienced by equipment packaged for transportation, said impact indicator device comprising a frangible means having a predetermined breaking value, means sensitive to accelerational forces associated with said frangible means for directing a load to said frangible means in excess of the breaking value of said frangible means when said indicator device senses excessive accelerational forces, a transparent outer case supporting said accelerational force sensitive means about said frangible means, and a holding frame including a base portion having a centrally located recess for supporting said outer case and a strap portion connecting said base portion for supporting within said strap portion and said base portion said outer case, and said strap portion permitting visual access to said outer case to determine whether the breaking value of said frangible means has been exceeded by the excessive accelerational forces.

4. An impact indicator device utilized to establish the dynamic loading experienced by equipment packaged for transportation, said impact indicator device comprising a frangible means having a predetermined breaking value, means sensitive to accelerational forces associated with said frangible means for directing a load to said frangible means in excess of the breaking value of said frangible means when said indicator device senses excessive accelerational forces, a colored liquid in said frangible means, and a transparent case supporting said accelerational force sensitive means adjacent said frangible means so that said colored liquid may be spilled within said outer case to indicate that said frangible means has been broken due to an excessive acceleration of the indicator device.

5. An impact indicator device utilized to establish the dynamic loading experienced by equipment packaged for transportation, said impact indicator device comprising a frangible means having a predetermined breaking value, means sensitive to accelerational forces associated with said frangible means for directing a load to said frangible means in excess of the breaking value of said frangible means when said indicator device senses excessive accelerational forces, said frangible means including a frangible sphere, said accelerational force sensitive means including a plurality of balls, and a ball bearing case supporting said balls adjacent to said brittle sphere and spaced equal distance from each other.

6. The combination defined by claim 5 including weights adjacent one of said balls for directing said ball bearing cage for lining up opposed balls in a sensitive axis so as to effect a breaking force by a ball diagonally opposite said one ball acting on the sensitive axis centrally against said frangible sphere upon an excessive accelerational force being sensed thereby.

7. The combination defined by claim 6 including a colored liquid carried by the frangible sphere to provide a visual indication of a breakage of said frangible sphere.

8. The combination defined by claim 7 including an outer case for supporting therein said balls adjacent said frangible sphere, a two-piece holding frame for supporting said outer case, said frame including means for attaching the frame to a package with which the indicator may be utilized to establish a dynamic loading shock experienced in transportation of the package.

References Cited
UNITED STATES PATENTS

| | | | |
|---|---|---|---|
| 2,601,440 | 6/1952 | Kerrigan | 116—114 |
| 2,674,221 | 4/1954 | Tinsley | 116—114 |
| 3,021,813 | 2/1962 | Rips | 116—114 |
| 3,117,455 | 1/1964 | Shepherd | 73—492 |
| 3,136,293 | 6/1964 | Schmitt | 116—114 |
| 3,141,440 | 7/1964 | Platt | 116—114 |

LOUIS J. CAPOZI, *Primary Examiner.*